United States Patent
Bailey et al.

(10) Patent No.: US 11,212,143 B1
(45) Date of Patent: Dec. 28, 2021

(54) SLIDING BLOCK DECISION EQUALIZER

(71) Applicants: James Raymond Bailey, Toronto (CA); Mohammad Hossein Shakiba, Richmond Hill (CA)

(72) Inventors: James Raymond Bailey, Toronto (CA); Mohammad Hossein Shakiba, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/915,302

(22) Filed: Jun. 29, 2020

(51) Int. Cl.
*H04L 25/03* (2006.01)
*H04L 27/01* (2006.01)

(52) U.S. Cl.
CPC .. *H04L 25/03057* (2013.01); *H04L 25/03885* (2013.01); *H04L 27/01* (2013.01); *H04L 2025/0349* (2013.01); *H04L 2025/03617* (2013.01)

(58) Field of Classification Search
CPC ....... H04L 25/03057; H04L 2025/0349; H04L 25/0307; H04L 27/01; H04L 2025/03617; H04L 25/03885
USPC .................................................. 375/229–234
See application file for complete search history.

(56) References Cited

U.S. PATENT DOCUMENTS

| | | | |
|---|---|---|---|
| 6,621,862 B1 * | 9/2003 | Dabell | H04L 25/03038 375/229 |
| 8,787,439 B2 | 7/2014 | Palusa et al. | |
| 9,077,574 B1 | 7/2015 | Healey et al. | |
| 2002/0196844 A1 * | 12/2002 | Rafie | H04L 25/03038 375/232 |
| 2004/0240539 A1 * | 12/2004 | Shanbhag | H04L 25/0307 375/233 |
| 2004/0264552 A1 * | 12/2004 | Smee | H04L 25/03063 375/147 |
| 2005/0190832 A1 * | 9/2005 | Ibragimov | H04L 25/03057 375/233 |
| 2006/0245486 A1 * | 11/2006 | Choudhary | H04L 25/0307 375/233 |

(Continued)

FOREIGN PATENT DOCUMENTS

| | | |
|---|---|---|
| CN | 102301665 A | 12/2011 |
| CN | 107026658 A | 8/2017 |

OTHER PUBLICATIONS

K. K. Parhi and D. G. Messerschmitt, "Static rate-optimal scheduling of iterative data-flow programs via optimum unfolding," in IEEE Transactions on Computers, vol. 40, No. 2, pp. 178-195, Feb. 1991.

(Continued)

*Primary Examiner* — Emmanuel Bayard

(57) ABSTRACT

A method and apparatus for signal equalization are provided. Multiple decision components are arranged in a sequence, beginning with a history portion and ending with a decode portion. Each decision component performs a decode decision on a symbol. Decode decisions are passed forward to other decision components where they can be used to compensate for intersymbol interference. Decode decision output by the history portion are otherwise discarded, while decode decisions output by the decode portion are output as a decoded signal. In the next decode cycle, input previously provided to the decode portion is again provided to the history portion, in a sliding, overlapping block manner.

20 Claims, 13 Drawing Sheets

(56) References Cited

U.S. PATENT DOCUMENTS

| | | | |
|---|---|---|---|
| 2007/0183489 A1* | 8/2007 | Zhidkov | H04L 25/03057 375/229 |
| 2008/0008233 A1 | 1/2008 | Cohen | |
| 2008/0037621 A1* | 2/2008 | Higure | H04L 25/0307 375/231 |
| 2014/0146867 A1* | 5/2014 | Shvydun | H04L 25/03885 375/233 |
| 2014/0310580 A1* | 10/2014 | Zhang | H03M 13/3746 714/780 |
| 2021/0211333 A1* | 7/2021 | Wang | H04L 27/34 |

OTHER PUBLICATIONS

A. L. Pola, D. E. Crivelli, J. E. Cousseau, O. E. Agazzi and M. R. Hueda, "A new low complexity iterative equalization architecture for high-speed receivers on highly dispersive channels: Decision feedforward equalizer (DFFE)," 2011 IEEE International Symposium of Circuits and Systems (ISCAS), Rio de Janeiro, 2011, pp. 133-136.

Kou-Hu Tzou and J. Dunham, "Sliding Block Decoding of Convolutional Codes," in IEEE Transactions on Communications, vol. 29, No. 9, pp. 1401-1403, Sep. 1981.

P. J. Black and T. H.-. Meng, "A 1-Gb/s, four-state, sliding block Viterbi decoder," in IEEE Journal of Solid-State Circuits, vol. 32, No. 6, pp. 797-805, Jun. 1997.

A. L. Pola, J. E. Cousseau, O. E. Agazzi and M. R. Hueda, "Efficient decision feedforward equalizer with parallelizable architecture," 2013 IEEE International Symposium on Circuits and Systems (ISCAS2013), Beijing, 2013, pp. 2771-2774.

\* cited by examiner

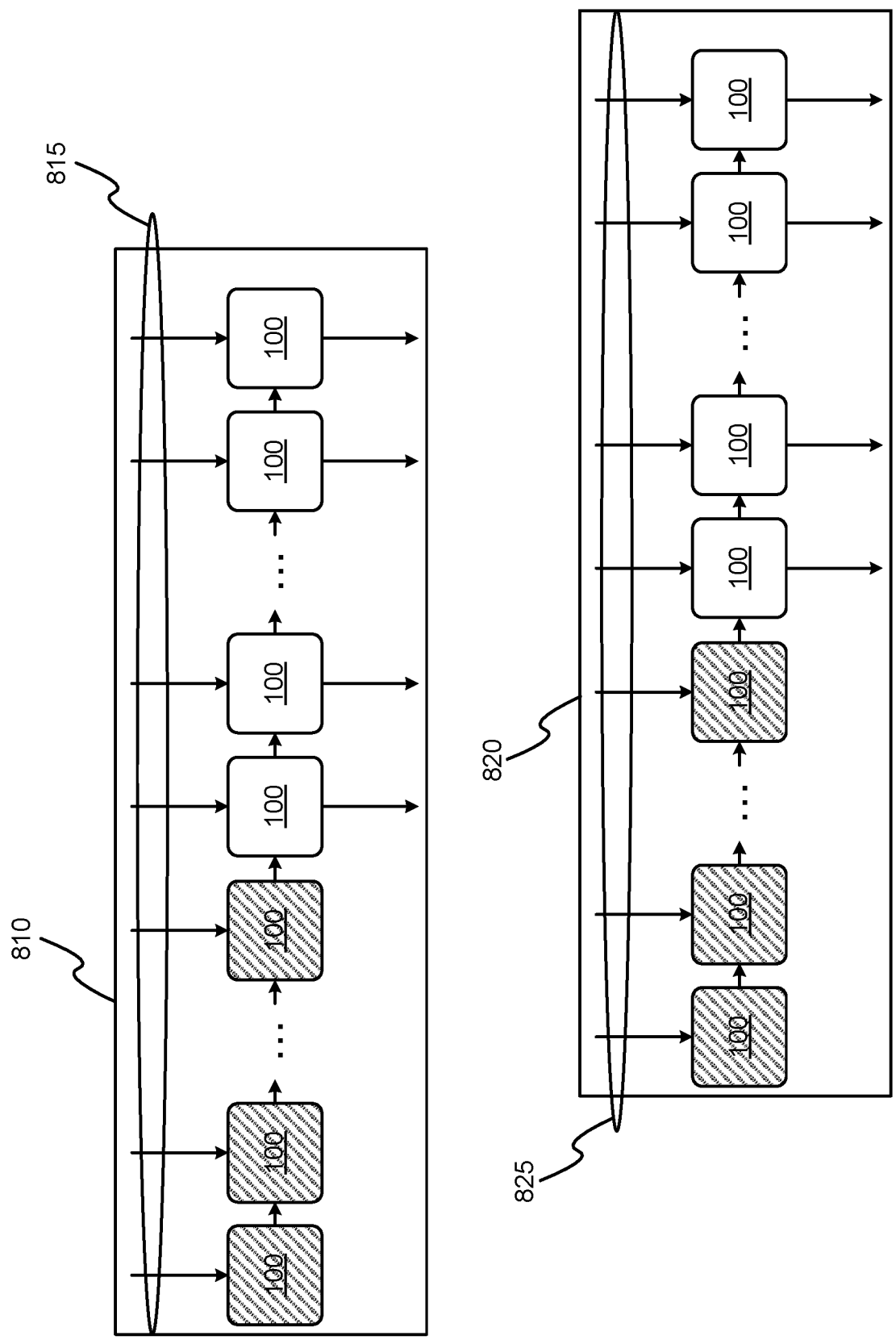

SLIDING BLOCK DECISION EQUALIZER

CROSS-REFERENCE TO RELATED APPLICATIONS

This is the first application filed for the present invention.

FIELD OF THE INVENTION

The present invention pertains to communication devices and in particular to a decision-based equalizer and associated method for use in communication signal receivers.

BACKGROUND

Detection of received signals in data communication systems is complicated by several factors including noise, cross-talk, and Inter-Symbol Interference (ISI). These complications tend to grow as the industry moves to high performance and lower cost systems. Detection systems are relevant in wired, wireless and optical communication systems.

One common and effective method of removing ISI from a received signal is through Decision Feedback Equalization (DFE). The DFE is a common equalization method in receivers that removes ISI from a received signal based on previous symbol decisions and then makes a decision on the received symbol currently under consideration. The DFE is a well-understood technique across academia and industry.

DFE integrated circuits (ICs) are becoming increasingly difficult to build as both data throughput increases, and as the amount of ISI in received signals spans over an increasing number of symbols. Because of this increased implementation complexity, the integrated circuit area and power consumption of DFE circuits can be a significant proportion of total receiver power and ultimately a significant factor in the market competitiveness of a receiver. The lack of frequency-scaling in current and upcoming submicron CMOS technologies is an imminent problem in scaling receiver data rates while maintaining the performance of traditional DFEs.

The conventional DFE has a computationally recursive feedback loop that must be completed in one symbol-time (UI) per symbol decoded. Implementing this feedback loop to operate at sufficiently high speed is known as timing closure. This is the primary challenge in implementing power, performance, area (PPA) competitive DFEs in the data communications IC industry.

One DSP optimization technique that is used in industry to make DSP-DFE timing closure feasible is called Loop unrolling (or speculative DFE). In this technique, speculative decisions are made for the current symbol based on all possible combinations of previous symbols. Speculative decisions are flopped (captured or held) for timing relief, and then speculation is resolved when previous decisions become available. Another technique is called Loop Unfolding, in which resolution of the unrolled speculation of current symbol can be implemented as a function of arbitrary number of previous symbol's speculative decisions plus a single final decision. This allows implementation with the critical timing path being through only a series of multiplexers, which are relatively fast. These optimizations have enabled up to 2-tap DFEs to be implemented in 60 Gbps Long Reach (LR) class Serializer-Deserializers (SerDes).

A variant of the DFE is the Decision Feed Forward Equalizer (DFFE), as described for example in Pola et al. in "A Low-Complexity Decision Feedforward Equalizer Architecture for High-Speed Receivers on Highly Dispersive Channels," Journal of Electrical and Computer Engineering, 2013. The DFFE is similar to the DFE but limits the computational recursion for decoding a received symbol to the previous R symbols. The value of R is dependent on a number of system considerations, notably the channel response. By limiting the computational recursion for decoding a symbol, each symbol can be decoded independently of every other symbol in a feed forward data flow. Feed forward circuits such as the DFFE can achieve timing closure at high frequencies through heavy pipelining that is not possible in circuits with feedback such as the DFE.

Both the DSP optimizations discussed and the DFFE come with significant drawbacks and limitations. The DSP techniques above have exponential and polynomial scaling of area and power in key design parameters such as number of taps and number of symbols. The DFFE comes at a power and area overhead cost proportional to data throughput. The power and area overhead of the DFFE are significant and make it uncompetitive at LR- and shorter class SerDes and it has not seen market adoption.

Therefore, there is a need for a signal equalization method and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a sliding block signal equalization apparatus, and a corresponding method. The signal equalization apparatus can be implemented in a communication signal receiver to detect symbols in a received signal. In particular, the signal equalization apparatus can operate to remove or mitigate intersymbol interference (ISI) in a received signal. The apparatus can be used for signal processing in a variety of communications systems (e.g. wired, optical or wireless) which are subject to ISI.

Embodiments of the present invention partition a received symbol stream into discrete blocks of symbols that are decoded via computation independently of other blocks of symbols. The computation may be comparable to that used in traditional DFE, but without feedback being applied. Results of one or more symbol decisions at the beginning of a sequence of such decisions, known as the history, may be used to facilitate symbol decisions of two or more subsequent symbols made in the remainder of the sequence of decisions. The decisions of the history portion of the sequence may be discarded. The apparatus amortizes the implementation complexity of initial symbol estimation, or history, over multiple symbol decisions. This can potentially lead to greater efficiency. The implementation may use arithmetic precision that varies in different locations in the block. Approximate arithmetic functions may be used. A substantially arbitrary form of initial symbol estimation may be used to seed the decisions at start of the block. Multiple instances of the method and apparatus may be implemented in parallel to reduce decode latency or provide other PPA benefits. The method or apparatus may be configured to a variable history size to provide dynamic post-manufacture PPA scaling depending on the application requirements.

Some implementations may have roaming taps that can have their symbol delay configured post-manufacture depending on the application requirements. Such embodiments may provide for advantageous flexibility in implementation. The apparatus may be paired with additional front end signal processing that varies as a function of symbol location in the sequence.

In accordance with embodiments of the present invention, there is provided an equalization apparatus comprising a sequence of decision components including a first decision component and two or more further decision components. The first decision component is configured to receive a first input signal and includes a first decisor configured to provide a first output based at least in part on the first input signal. The first output is indicative of an estimate of a symbol conveyed by the first input signal. The further decision components are arranged in the sequence beginning with the first decision component. Each of the further decision components is configured to receive a further respective input signal and includes a further respective decisor. The further decisor is configured to provide a further respective output based at least in part on the further respective input signal mixed with: at least part of the first output of the first decision component; at least part of the further respective output of at least one of the further decision components in the sequence prior to said one of the further decision components; or a combination thereof. The further respective output is indicative of another estimate of another symbol conveyed by the further respective input signal. At least one of the decision components operates independently of output of all decision components located, in the sequence, after said at least one of the decision components. At least one of the further respective outputs which is at least partially mixed with the further respective input signal of another one of the decision components is also provided as an output of the equalization apparatus.

According to some embodiments, the apparatus further includes a deserializer configured to receive and output a plurality of successive signal samples. During a first time interval, the deserializer provides a first block of the plurality of successive signal samples as different respective ones of the input signal and the further respective input signals. During a second time interval, the deserializer provides a second block of the plurality of successive signal samples as different respective ones of the first input signal and the further respective input signals. The first block and the second block partially overlap. The deserializer continues in this manner with further samples.

According to some embodiments, the decision components include a first subset (the history portion) and a second subset (the decode portion). The first subset are arranged contiguously in the sequence and include the first decision component. The second subset are arranged contiguously in the sequence after the first subset. Each of said at least one of the further respective outputs which is also provided as an output of the equalization apparatus is an output of a respective one of the second subset of decision components.

According to some embodiments, the deserializer is configured, during a first time interval, to provide a first block of successive signal samples. The first block includes a sub-block of signal samples which are provided as different respective ones of the further respective input signals of the first subset of decision components. During a second time interval, the deserializer is configured to provide a second block of successive signal samples which overlaps with the first block. In particular, the second block includes the same sub-block of signal samples as the first block, now provided as different respective ones of the input signal and the further respective input signals of the first subset of decision components.

Similarly, in accordance with embodiments of the present invention, there is provided an equalization apparatus comprising a plurality of at least three decision components arranged in a sequence beginning with a first decision component. The first decision component is configured to receive a first input signal and includes a first decisor configured to provide output indicative of a first estimate of a symbol conveyed by the first input signal. Each one of the decision components subsequent to the first decision component is configured to receive a further respective input signal and comprises a further respective decisor. The further decisor is configured to provide output indicative of a further respective estimate of a further respective symbol conveyed by the further respective input signal. The output is based on the further respective input signal mixed with output of another one of the decision components located in the sequence prior to (e.g. immediately prior to) said one of the decision components. Each one of the decision components operates independently of output of all of the decision components located, in the sequence, after said one of the decision components. The plurality of decision components includes: a first subset of decision components (the history portion) arranged contiguously in the sequence, the first subset including the first decision component. The plurality of decision components includes a second subset of decision components (the decode portion) arranged contiguously in the sequence immediately after the first subset. For each one of the decision components in the second subset, the output indicative of the further respective estimate of the further respective symbol is also provided as an output of the equalization apparatus.

In accordance with embodiments of the present invention, there is provided a system comprising a first and second equalization apparatus. The first equalization apparatus is as described above and is configured to receive and process a first plurality of signal samples. The second equalization apparatus, which is also as described above, operates in parallel with the first equalization apparatus and configured to receive and process a second plurality of signal samples. The first plurality of signal samples and the second plurality of signal samples may correspond to different overlapping or non-overlapping portions of a plurality of successive samples of a received signal.

In accordance with embodiments of the present invention, there is provided a method for signal equalization, decoding, or both. According to a first operation a first input signal is received and a first output is provided based at least in part on the first input signal. The first output is indicative of an estimate of a symbol conveyed by the first input signal. According to each one of two or more further operations performed as part of a sequence beginning with the first operation, a further respective input signal is received. A mixed signal is generated by mixing the further respective input signal with: at least part of the first output; at least part of a further respective output of at least one of the further operations occurring in the sequence prior to said one of the further operations; or a combination thereof. A further respective output is provided based at least in part on the mixed signal, the further respective output indicative of another estimate of another symbol conveyed by the further respective input signal. An output of the method provides at least one of the further respective outputs which is at least partially mixed with the further respective input signal of another one of the operations. At least one operation of the first operation and the two or more further operations is performed independently of output of all of said operations located, in the sequence, after the at least one operation. Various other aspects of the method can be provided in accordance with embodiments of the apparatus as discussed above and elsewhere herein. The method may be implemented in electronic hardware, using a computer processor appropriately configured via computer program instructions, or a combination thereof.

A potential advantage of embodiments of the present invention is that, in contrast to previous approaches, it may provide for a higher-speed, higher-tap-count decision-based equalizer based on design principles similar to those of DFE, with competitive PPA attributes. Embodiments of the present invention may address or solve the timing closure challenge of traditional DFEs by terminating the computational recursion to the length of a given block size, which is the number b of decision components operating in a sequence. By terminating the recursion, the implementation can be pipelined as necessary to close timing. Embodiments of the present invention may address or solve the uncompetitive PPA of the DFFE by amortizing the overhead of breaking the recursion (feedback loop) over many output decisions. The overhead can be represented by the history size h, while the number of output decisions is given by k, which is the number of symbols decoded per cycle. This is expected to lead to a superior PPA as compared for example to the prior art DFFE technique. For example, the power overhead for embodiments of the present invention is anticipated to be approximately proportional to k+h, whereas the power overhead for DFFE is thought to be approximately proportional to k·h.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 8A illustrates an implementation of two signal processing apparatuses in parallel, according to another embodiment of the present invention.

It will be noted that throughout the appended drawings, like features are identified by like reference numerals.

DETAILED DESCRIPTION

Figure 1:
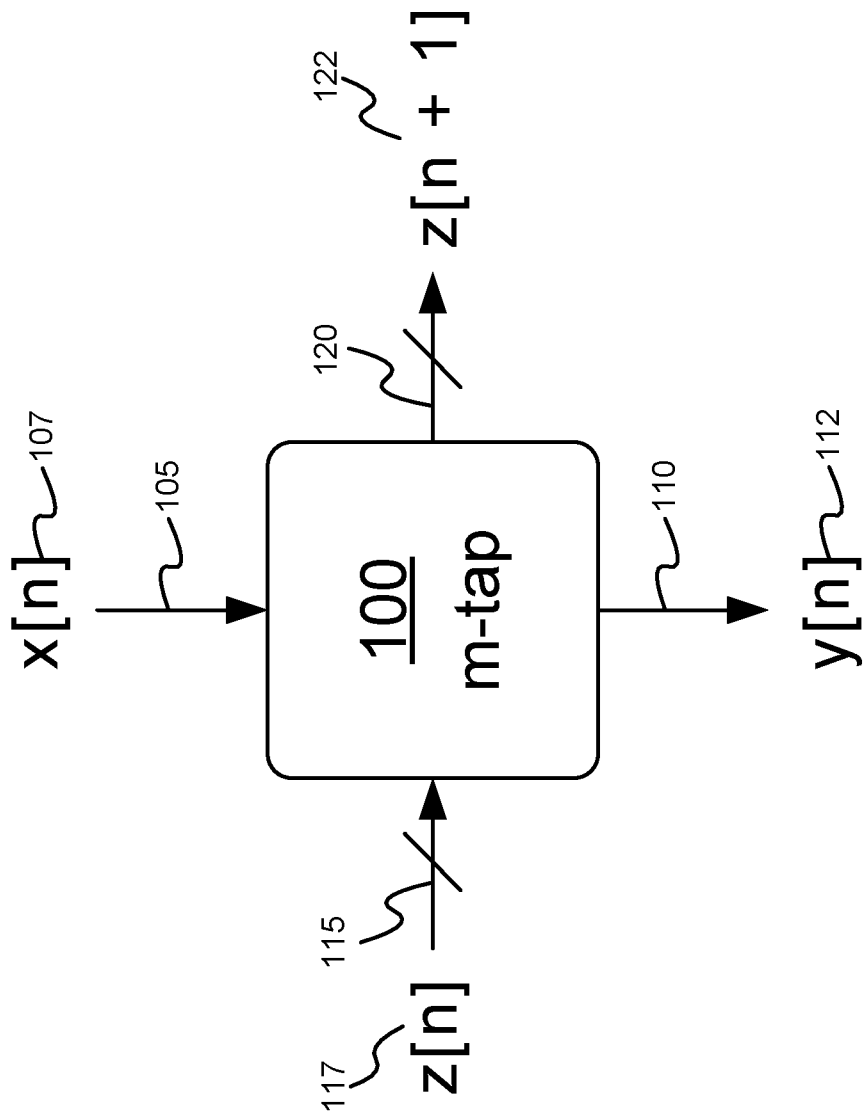
FIG. 1 illustrates, in block diagram form, an example of a decision component provided as a building block according to embodiments of the present invention.

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention provide for an equalization apparatus comprising multiple decision components arranged in a sequence. Each decision component can be substantially similar or identical, although the first decision component in the sequence may or may not have the same inputs or mixing components as later decision components. Output of decision components earlier in the sequence is provided to decision components occurring later in the sequence. The output of each decision component is an indication of the symbol which is estimated to be conveyed in an input signal sample that is received by that decision component.

In more detail, embodiments of the present invention provide for a block-based decoder of size b=h+k that makes a decision for each of b input signal samples (also referred to as signal inputs) in the block using a computation or corresponding circuitry. The first h signal inputs are passed to decision components which provide their outputs only as supportive inputs to subsequent decision components, and otherwise have their outputs discarded. This is referred to as the history portion of the decoder. The subsequent k>1 signal inputs are passed to decision components which provide their outputs both as supportive inputs to subsequent decision components and also as outputs of the equalization apparatus, i.e. as symbols in a final output decision. This is referred to as the decode portion of the decoder. In other words, each of the outputs which is provided as an output of the equalization apparatus is an output of a decision component in the decode portion, while none of the outputs of decision components in the history portion are provided as outputs of the equalization apparatus. Outputs of the history portion are not sufficiently reliable to be used as final symbol decision outputs, due to the relative lack of reliability of their supportive inputs.

For greater clarity, the history portion may include a first subset of decision components arranged contiguously in the sequence. The decode portion may include a second subset of decision components arranged contiguously in the sequence after the first subset. Notably, each of the respective outputs (e.g. of decision components in the decode portion) which are also provided as an output of the equalization apparatus may be outputs of decision components in the decode portion.

Following one iteration of the above operation, the signal input to the apparatus slides forward by k symbols after each block of b symbols is decoded. That is, if in a given cycle the input to a particular decision component is x[n], then in the next cycle the input to that decision component will be x[n+k], where x will be as described below and each decision component is (typically) fed with an input at each cycle. As such, each signal input may be passed through the apparatus (at least) twice, for example in the event that k<h. In other words, input signal samples provided to the decision components during two successive time intervals will partially overlap. A deserializer can be provided and configured to receive successive signal samples and provide them to the decision components in such an overlapping manner. Because of this overlap, the deserializer is referred to as a sliding deserializer. The deserializer can receive these signal samples from an analog-to-digital converter, for example.

Each decision component receives a corresponding input signal and provides, as output, an estimate of a symbol conveyed by the input signal. Each decision component (other than possibly the first decision component) receives the output of one or more previous decision components in the sequence, and provides its output to later decision components in the sequence. The output of the one or more previous decision components is (e.g. additively) mixed with the input signal and the resulting mixed signal is passed to a decisor, which generates the output. As such, the output provided by the decisor is based on the input signal mixed with outputs of one or more previous decision components in the sequence. It is noted that not all of the outputs of such a previous decision component are necessarily mixed with the input signal. Rather, in some cases only a part of the output of a previous decision component is mixed with the input signal.

Figure 2:
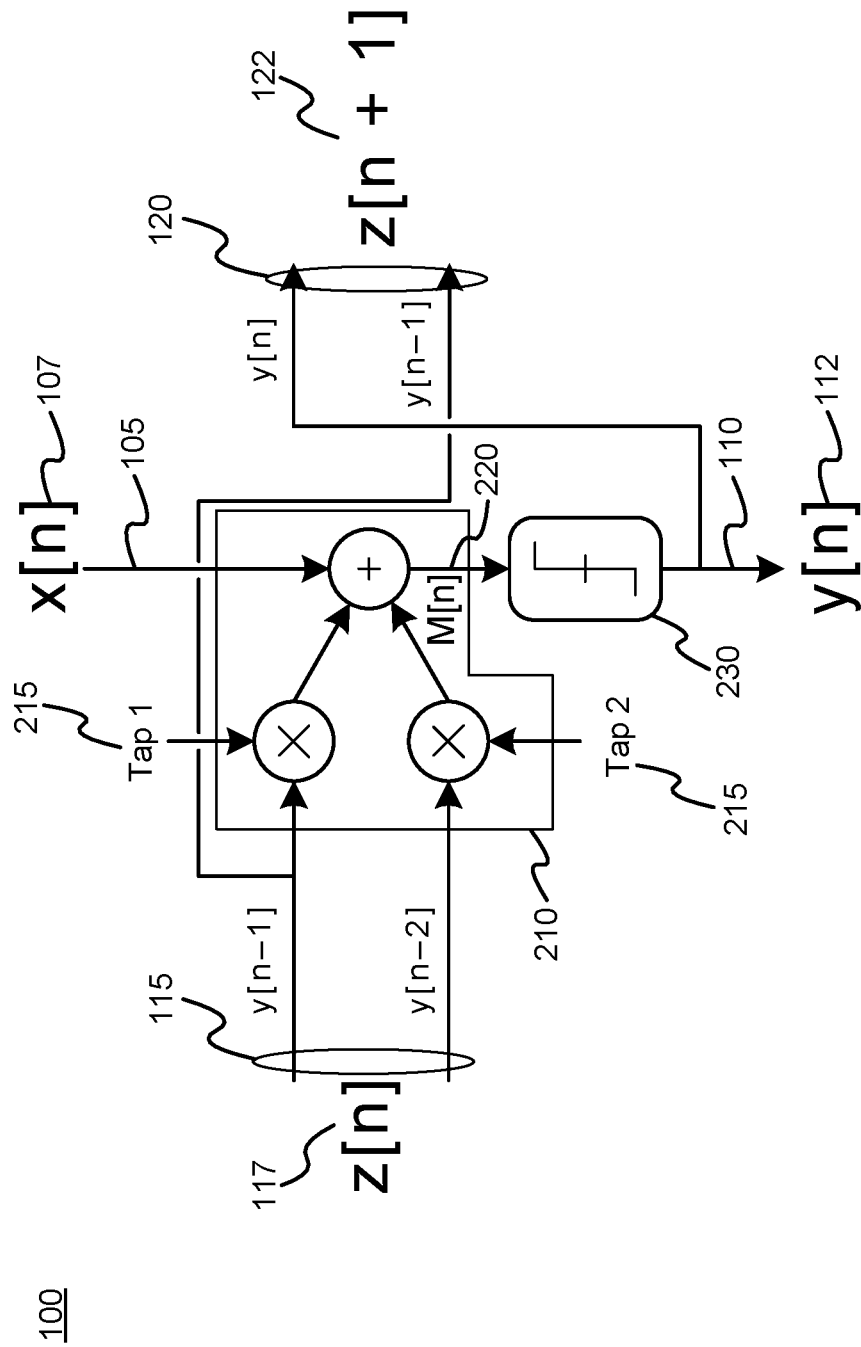
FIG. 2 illustrates a two-tap example of the decision component according to FIG. 1, including the inner details, according to one embodiment.

FIG. 1 illustrates, in block diagram form, an example of such a decision component 100. FIG. 2 further illustrates a two-tap example of such a decision component, including the inner details according to one embodiment. The decision component 100 includes an input 105 for receiving an input signal x[n] 107. The input signal x[n] may be the multi-bit output originating from an analog-to-digital converter (ADC) or another signal processing component. This is the case for example when the equalization apparatus is a digital signal processing (DSP) based apparatus. Alternatively, the input signal x[n] 107 may be an analog signal level in a mixed analog-digital signal implementation. The embodiments as discussed herein generally pertain to the apparatus in a DSP context, but various embodiments also apply to a mixed-signal implementation, as will be readily understood. The input signal x[n] can be conveyed to the input 105 via an appropriately configured deserializer.

The decision component 100 further includes an output 110 for providing an output y[n] 112. The output is a symbol decision made by the decision component, and more particularly is an estimate of a symbol conveyed by the input signal x[n] 107. In order to compensate for ISI, the decision component also receives, at a supportive input 115, a decision history vector z[n] 117. The decision history vector (also describable as a post-decision vector) comprises or consists of m outputs of one or more decision components prior to the current decision component in the sequence. That is, $z[n] = \{y[n-1], y[n-2], \ldots, y[n-m]\}$. The value m can be set according to design requirements, and the decision component is referred to as an m-tap decision component. In some embodiments, the number of taps is 1, 2, or another number less than 10. In some embodiments the number of taps is between 10 and 20. In some embodiments the number of taps is between 20 and 100. Other numbers of taps are theoretically possible, but the number of taps is limited by practical considerations such as circuit complexity limitations. The decision component can include an additive mixer 210 (see FIG. 2) which mixes the signals received at the supportive input 115 with the input received at input 105. The mixer multiplies each component of the supportive input (i.e. components of the decision history vector) by a corresponding predetermined or controllable tap value 215 (FIG. 2), and adds output of such multiplication together with the input signal x[n] 107. This produces a mixer output value M[n] 220 (FIG. 2) of:

$$M[n] = x[n] + \sum_{i=1}^{m} y[n-i]T[i],$$

where each T[i] is a predetermined or controllable tap value for weighting components of the decision history vector. For clarity, the mixer may be configured to additively mix the input signal x[n] with at least part of the supportive outputs as provided by one or more decision components in the sequence prior to the present decision component.

The mixer output value M[n] 220 is provided to a decisor 230 (FIG. 2). The decisor is configured to output a "decision" on the symbol which is conveyed by the input signal x[n]. When the decision component is part of the decode portion of the apparatus, the decisor output is provided as an output y[n] 112 which is conveyed as an output of the apparatus. Otherwise, when the decision component is part of the history portion of the apparatus, the decisor output is only passed to a further decision component in the sequence and the separate output y[n] 112 may be omitted.

The action of the mixer is to compensate for ISI by adding suitably weighted portions of previous decision outputs to the input signal. The decisor 230 can act and be referred to as a slicer, a quantizer, a comparator, a bank of comparators, or the like. Suitable implementations of devisors and mixers with suitable tap weights may be similar to the corresponding implementations and components of other decision feedback equalizers which are already known and well-studied in the art.

Except for possibly the last decision component in the sequence, the decision component 100 further includes a supportive output 120 which provides a decision history vector $z[n+1] = \{y[n], y[n-2], \ldots, y[n-m+1]\}$ 122. The supportive output 120 is provided at the supportive input 115 of the next decision component in the sequence.

For simplicity, in FIGS. 1 and 2 (and also FIG. 3), the supportive output of each decision component is shown as being provided as the supportive input to the next decision component, in a daisy-chain manner. To facilitate this, some of the components of the decision history vector are shown as being passed, unaltered, from the supportive input to the supportive output. This can be seen most clearly in FIG. 2, with reference to component y[n−1]. However, it should be noted that, whenever a component of the supportive output is derived by unaltered passing a component of the supportive input from an unaltered input, the corresponding signal line may also bypass the decision component entirely. As such, a decision component can receive, as its supportive input, the outputs of multiple prior decision components.

For clarity, the index variable n is used herein to denote a time index, or similar index. For example, x[n] may denote the $n^{th}$ signal sample, while y[n] may denote the $n^{th}$ symbol estimate corresponding to the $n^{th}$ signal sample.

Figure 3:
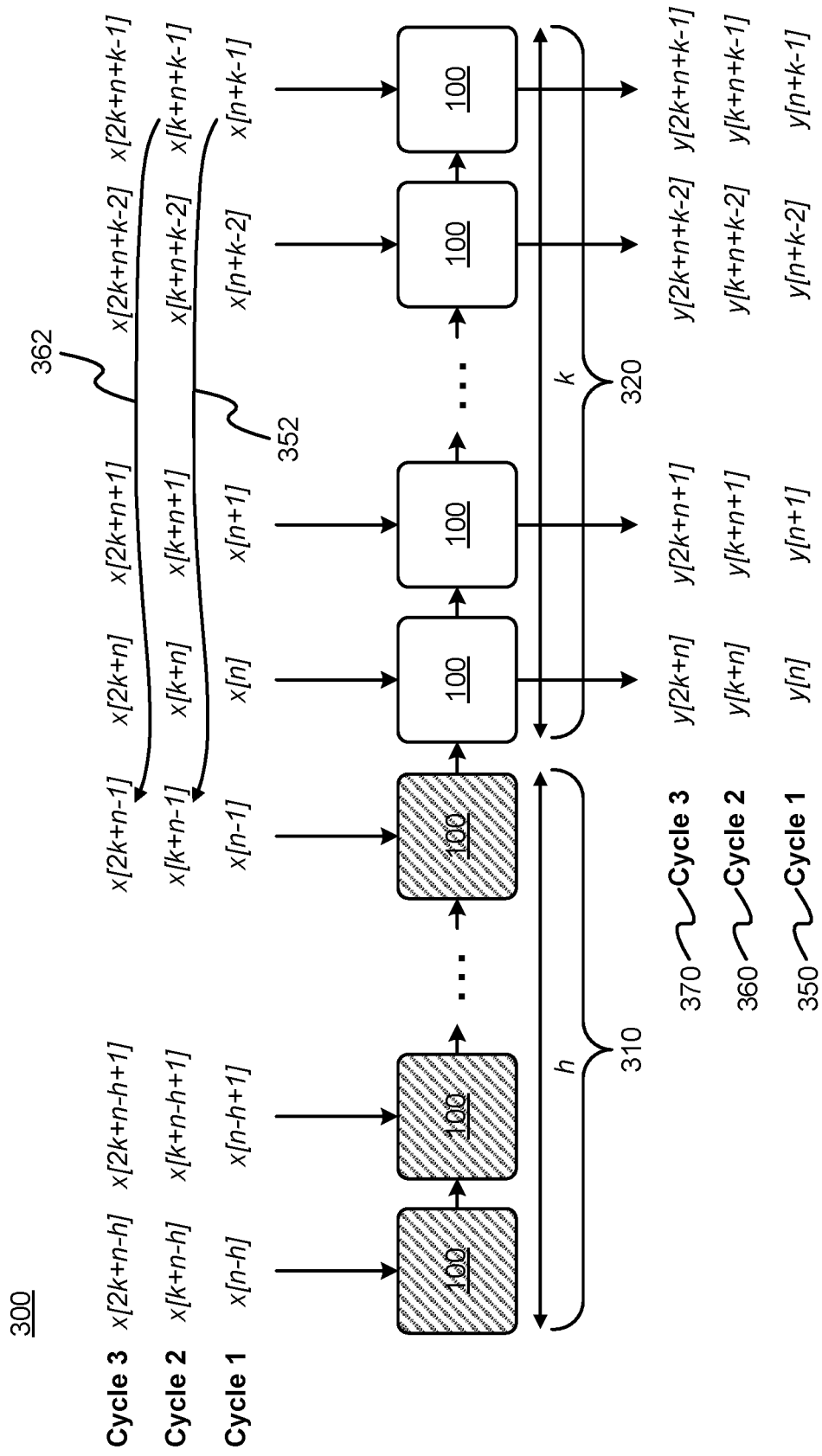
FIG. 3 illustrates a signal processing apparatus comprising a plurality of decision component building blocks arranged in a sequence, according to an embodiment of the present invention.

FIG. 3 illustrates a plurality of the above-described decision components 100 arranged in a sequence, according to an embodiment of the present invention. This plurality can form the primary decoding part 300 of an equalization apparatus. The sequence includes a history portion 310 and a decode portion 320. The history portion includes h decision components and the decode portion includes k decision components, where h and k are fixed or configurable by design and the total block size is given as b=h+k. The supportive output 120 (See FIG. 1) of each decision component is provided as the supportive input 115 (See FIG. 1) to the next decision component in the sequence. In a given cycle, each successive decision component 100 in the sequence receives, at its input 105 (See FIG. 1), an input signal 107 (See FIG. 11) according to a different successive index. As illustrated, decision components in the history portion 310 pass their supportive outputs to the next decision component in the sequence. Decision components in the decode portion 320 generally pass their supportive outputs to the next decision component in the sequence and also provide their outputs y[n] 112 (See FIG. 1) as outputs of the equalization apparatus. As such, and as already mentioned above, not all outputs y[n] of all decision components in the sequence are provided as outputs of the equalization apparatus. Rather, outputs of decision components earlier in the sequence (i.e. in the history portion) are only fed to inputs of subsequent decision components. Outputs of decision components later in the sequence (i.e. in the decode portion) are provided as outputs of the equalization apparatus.

Notably, more than one of the outputs of a decision component (i.e. a supportive output) which is mixed with the input signal of another (later) decision component is also provided as an output of the equalization apparatus. As such, and referring to FIG. 3, it is not only the last decision component in the decode portion that provides an output of the equalization apparatus. Rather, multiple decision components in the decode portion provide respective outputs of the equalization apparatus. This facilitates the amortization of the overhead of breaking the feedback loop over multiple symbol decodes.

It is also notable that a given decision component will operate independently of output of all of the decision components which are located, in the sequence, after the given decision component. This may be the case for at least one of the decision components. This may be the case for all of the decision components. In other words, output of decision components is only fed to decision components later in the sequence, not to decision components earlier in the sequence. As such, the feedback loop is broken.

FIG. 3 further illustrates the sliding block operation of the equalization apparatus, by showing the inputs and outputs generated according to three successive operating cycles of the apparatus. The index values from n−h to 2k+n+k−1 are arbitrary and serve to orient the reader. In a first cycle 350, successive input signals from x[n−h] to x[n−1] are input to the h decision components of the history portion 310 and successive input signals from x[n] to x[n+k−1] are input to the k decision components of the decode portion 320. Also in the first cycle 350, successive outputs from the k decision components of the decode portion 320 are provided as successive outputs y[n] to y[n+k−1] of the equalization apparatus. Cycles can be clock cycles or other time intervals. The successive input signals from x[n−h] to x[n+k−1] may be referred to as a first block of a plurality of successive signal samples.

Similarly, in a second cycle 360, successive input signals from x[k+n−h] to x[k+n−1] are input to the h decision components of the history portion 310 and successive input signals from x[k+n] to x[k+n+k−1] are input to the k decision components of the decode portion 320. The successive input signals from x[k+n−h] to x[k+n+k−1] may be referred to as a second block of a plurality of successive signal samples, noting that the first and second blocks partially overlap. Also in the second cycle 360, successive outputs from the k decision components of the decode portion 320 are provided as successive outputs y[k+n] to y[k+n+k−1] of the equalization apparatus. The first and second cycles together output contiguous and non-overlapping outputs from y[n] to y[2k+n−1]. Contrastingly, the inputs received in the first and second cycles overlap. In particular, in the present example, inputs provided to the decode portion in the first cycle are also provided, in the second cycle, as inputs to the history portion. This is illustrated for example by arrow 352, which shows how input x[k+n−1] is provided twice. Depending on the values of h and k, some inputs may be passed through the equalization apparatus twice, while others are only passed through once, or all inputs may be passed through the equalization apparatus twice, or even more than twice.

In the same manner, in a third cycle 370, successive input signals from x[2k+n−h] to x[2k+n−1] are input to the h decision components of the history portion 310 and successive input signals from x[2k+n] to x[2k+n+k−1] are input to the k decision components of the decode portion 320. Also in the third cycle 370, successive outputs from the k decision components of the decode portion 320 are provided as successive outputs y[2k+n] to y[2k+n+k−1] of the equalization apparatus. The second and third cycles together output contiguous and non-overlapping outputs from y[k+n] to y[3k+n−1]. Contrastingly, the inputs received in the second and third cycles overlap. In particular, in the present example, inputs provided to the decode portion in the second cycle are also provided, in the third cycle, as inputs to the history portion. This is illustrated for example by arrow 362, which shows how input x[2k+n−1] is provided twice.

When the receiver first begins operating, the very first symbols can be treated in a variety of ways. In one embodiment, the very first k symbols are input to the decode portion along with arbitrary (e.g. null) symbol values input to the history portion. On the next cycle, the very first k symbols may be input to the history portion, possibly along with some arbitrary (e.g. null) symbols, as per the sliding block behaviour. Because a goal is to remove inter symbol interference, this may be adequate because when there are no prior symbols the inter symbol interference from same is expected to be non-existent. In another embodiment, the very first h symbols are input to the history portion and the subsequent k symbols are input to the decode portion. It is noted that in this embodiment the very first h symbols are not decoded. However, it is considered that the very first symbols may not be important, or may be set to null symbols (e.g. little to no transmit power) as part of a start-up procedure. The first symbols can also be training symbols carrying no actual data.

FIG. 3 illustrates how individual decision components can be assembled into an equalization or decoding apparatus. The input and output data for several cycles are annotated. Note that there is no history vector input to the first decision component in the sequence, on the left side of the figure; this is where the recursion is terminated.

To summarize, the above-presented embodiments of the present invention provide for a block-based equalization or decoding apparatus, which is built from components that are similar to those found in a traditional DFE. As such, a DFE-style decoder is implemented inside a sliding block overall architecture. The decode size k is the number of symbols decoded each clock cycle. The history size h is the number of prior symbols used for ISI estimation in the block. The block size b is the combined decode and history size h+k.

Each symbol within a block is decoded, in a decision component (or by a decision operation) manner similar to a traditional DFE and the decision provided as a result of this decoding is passed to the next decision component. The first h inputs in a block are the "history"—symbol decisions based on these inputs are used for ISI estimation in the next symbols and are otherwise discarded. The first decision component may have its supportive inputs omitted or tied off. For example, the supportive inputs can be fixed or arbitrary signals. In one implementation, the supportive inputs are grounded. This breaks the feedback loop and has the effect of separating symbols in the data stream into blocks. The next k inputs are the decoded portion of the block—symbol decisions based on these inputs are provided as the actual decoded data. A block of inputs subject to decoding, and then the decoder slides k symbols forward.

Figure 4:
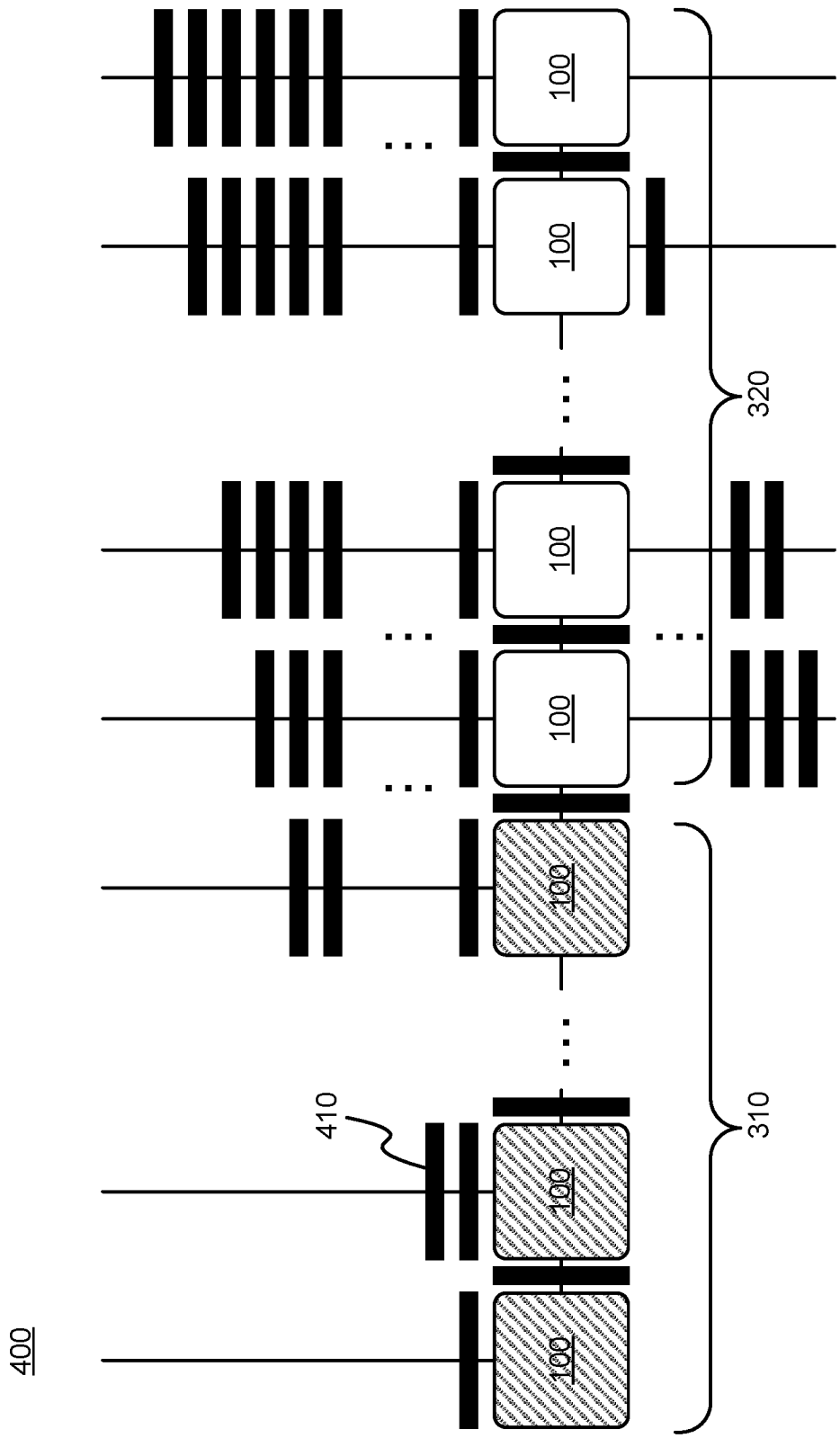
FIG. 4 illustrates a pipeline implementation of the apparatus of FIG. 3, according to another embodiment of the present invention.

FIG. 4 illustrates a pipeline implementation 400 of the apparatus of FIG. 3, according to another embodiment of the present invention. This implementation serves to illustrate how the apparatus can be readily implemented using desirable and effective pipelining implementations, as will be readily understood by a worker skilled in the art. In contrast, equalization apparatuses employing feedback, such as the traditional DFE, are not readily subject to such pipeline implementations. As with FIG. 3, the apparatus includes a plurality of decision components 100 arranged in sequence, in a history portion 310 and a decode portion 320. Each rectangular block 410 represents a delay element or pipeline stage, which receives an input signal and provides that same input signal as its output after a delay of one time unit. The time unit corresponds to the time delay between successive input signal samples x[k] and x[k+1]. In other words, the time unit can correspond to the symbol period in the received signal being equalized. The "time unit" mentioned in this paragraph is typically different from the "time interval" (e.g. clock cycle) mentioned elsewhere herein. Multiple delay elements in sequence can optionally be replaced with one or more delay elements having longer delays. As illustrated, the delay elements 410 are disposed at inputs and outputs of the decision components. The implementation of FIG. 4 uses a feed-forward cut-set pipelining technique, but it is not the only method of pipelining applicable to embodiments of the present invention.

Figure 5:
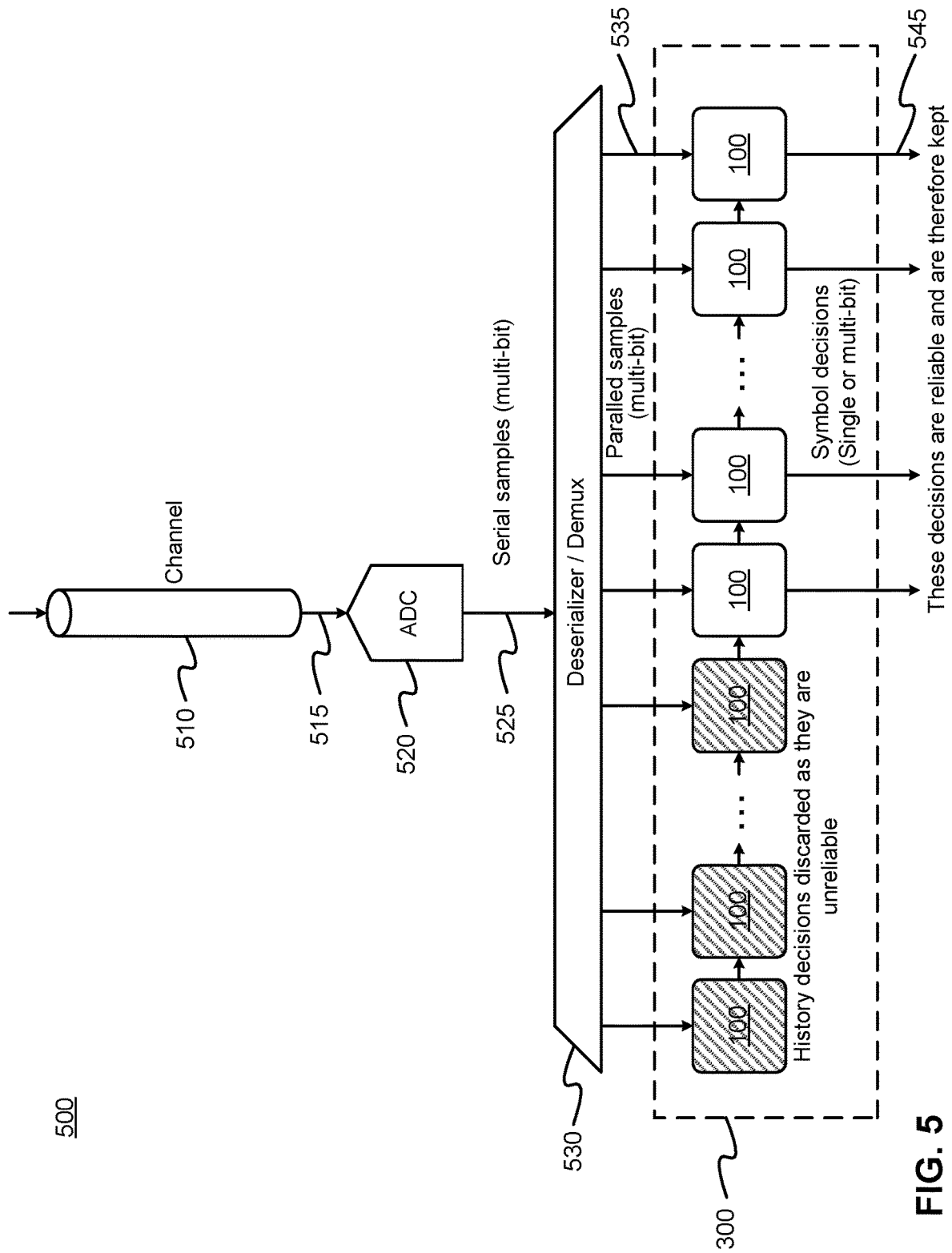
FIG. 5 illustrates a communication apparatus incorporating the apparatus of FIG. 3, according to an embodiment of the present invention.

FIG. 5 illustrates a broader communication apparatus 500 incorporating the apparatus of FIG. 3, according to an embodiment of the present invention. A signal 515 is received via a channel 510 and passed to an analog-to-digital converter (ADC) 520. The ADC 520 provides a series of multi-bit digital samples 525, each indicative of a portion of the received signal over a predetermined time period. The time period may be one symbol period. The samples 525 are then provided to a deserializer (also referred to as a demultiplexer or sliding deserializer) 530. The deserializer 530 outputs 535 each sample (of the series of multi-bit digital samples) to a different output port. The outputs 535 can be provided concurrently, or possibly in turn if proper delay elements are introduced, for example in accordance with a pipelining configuration. The outputs 535 are received and processed by the decoding apparatus 300 of FIG. 3, or a variant thereof as described elsewhere herein. Outputs 545 of the apparatus 300 may also be provided as outputs of the apparatus 500. These outputs represent symbols conveyed by the signal 515, after compensating for ISI.

It is noted that, in some embodiments, when a pipeline implementation such as that of FIG. 4 is used, delay may be applied at the deserializer outputs 535 in order to stagger inputs to the decision components. Delay elements can be implemented within the decoding apparatus 300 (or 400, as in FIG. 4), or within the apparatus 500 at the inputs and outputs to the decoding apparatus.

In some embodiments, the ADC may be omitted and an analog version of the apparatus may be implemented. In some embodiments, the ADC may be embedded in the deserializer.

The deserializer 530 may be a sliding deserializer which operates as follows, with reference by way of example to FIG. 3. During a first time interval, such as a first clock cycle (e.g. first cycle 350), the deserializer may provide a first block of the plurality of successive signal samples as different respective ones of the input signals which are provided directly or indirectly to the decision components of the decoding apparatus 300. The first block may be, for example, samples $x[n-h]$ to $x[n+k-1]$ as illustrated in FIG. 3. During a second time interval (e.g. immediately subsequent to the first time interval), such as a second clock cycle (e.g. second cycle 360), the deserializer may provide a second block of the plurality of successive signal samples as different respective ones of the same input signals. The second block may be, for example, samples $x[k+n-h]$ to $x[k+n+k-1]$ as illustrated in FIG. 3. Notably, the first block and the second block may partially overlap. For example, sample $x[k+n-1]$ (and its $h-1$ immediate predecessors) is part of both the first block and the second block in FIG. 3. As such, some or all signal samples can be provided (at least) twice: once to the decode portion of the decoding apparatus 300 and (at least) another time to the history portion of the decoding apparatus 300. In various embodiments, a given sample is passed through the decode portion first, and, in a subsequent time interval, the same sample is passed through the history portion, while newer samples are concurrently passed through the decode portion. When the deserializer provides (as part of its output) a given sequence (sub-block) of h samples to the last h decision components in one cycle, and then provides (as part of its output) the same h samples to the first h decision components in the next cycle, the deserializer is said to have an overlap of h samples. Put another way, during a first time interval (e.g. first clock cycle), the deserializer may provide, as part of a block of samples provided to all of the decision components, a sub-block of (e.g. h) signal samples. By way of example, the first sub-block may consist of samples $x[n+k-h]$ to $x[n+k-1]$ in FIG. 3. The samples in the sub-block are provided as different respective input signals to decision components in the decode portion. Then, during a second time interval (e.g. second clock cycle), the deserializer may provide, as part of another block of samples provided to all of the decision components, the same sub-block of signal samples, this time as different respective input signals to decision components in the history portion. The sub-block is a part of the sliding block.

In more detail, during the first time interval, the block of samples provided by the deserializer to the decode portion includes the above-mentioned sub-block. Concurrently, a first further sub-block of signal samples is provided as different respective input signals to decision components in the history portion (and possibly part of the decode portion). The first further sub-block may consist of signal samples received prior to those of the above-mentioned sub-block. For example, with reference to FIG. 3, cycle 1 350, the first further sub-block can consist of samples $x[n-h]$ to $x[n+k-h-1]$, which, together with the sub-block $x[n+k-h]$ to $x[n+k-1]$, makes up the first block. Then, during the second time interval, the block of samples provided by the deserializer to the decode portion again includes the above-mentioned sub-block. Concurrently, a second further sub-block of signal samples is provided as different respective input signals to decision components in the decode portion (and possibly part of the history portion). The second further sub-block may consist of signal samples received subsequently to those of the above-mentioned sub-block. For example, with reference to FIG. 3, cycle 2 360, the second further sub-block can consist of samples $x[k+n]$ to $x[k+n+k-1]$, which, together with the sub-block $x[n+k-h]$ to $x[n+k-1]$, makes up the second block.

Figure 6A:
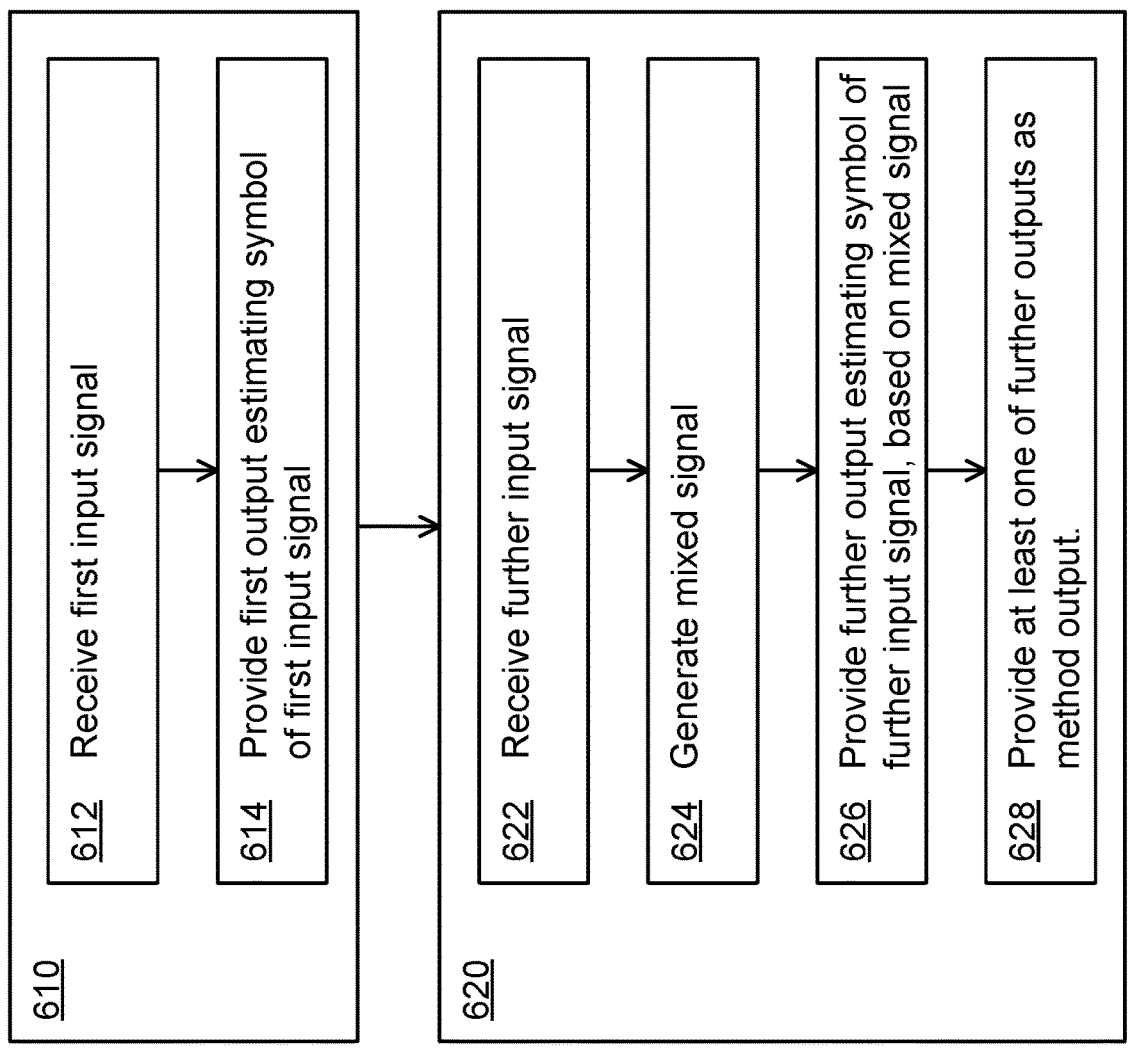
FIG. 6A illustrates a signal processing method provided in accordance with an embodiment of the present invention.

FIG. 6A illustrates a method 600 provided in accordance with an embodiment of the present invention. The method 600 includes a sequence of operations, including a first operation 610 and two or more further operations 620. For clarity, each operation corresponds to the operation of one of the components 100 as described above. At least one of the operations, and typically all or nearly all of the operations, are performed independently of output of all of the operations performed, in the sequence, after the at least one of the operations. This supports the "breaking" of the feedback loop. The operations can be performed using signal processing hardware, such as a computer processor, digital signal processor, electronic circuit such as an integrated circuit, etc. The operations can be performed using a computer processor implementing software or firmware instructions stored in memory.

The method 600 includes, according to the first operation 610, receiving 612 a first input signal and providing 614 a first output based at least in part on the first input signal. The first output is indicative of an estimate of a symbol conveyed by the first input signal. The method further includes, according to each one of two or more further operations 620, receiving 622 a further respective input signal, generating 624 a mixed signal, and providing 626 a further respective output. The mixed signal is generated 624 by mixing the further respective input signal with output of prior operations. This may include output of the first operation, output of one or more prior ones of the further operations, or both output of the first operation and output of one or more prior ones of the further operations. It may be all of the output of a prior operation which is mixed, or a portion of the output of a prior operation. According to an embodiment that conforms to the apparatus of FIG. 3, the entire output of the immediately prior operation is provided and mixed with the further respective input signal. However, this entire output may include output which is received by the immediately prior operation and passed unaltered as output.

Providing 626 the further respective output is based at least in part on the mixed signal. The further respective output is indicative of another estimate of another symbol conveyed by the further respective input signal. The method includes providing 628, as an output, at least one of the further respective outputs. In particular, at least some of these further respective outputs are from among those which are (at least partially) mixed with the further respective input signal of another one of the operations. In other words, at least one of the operations which provides its output to a further operation also provides this output as a symbol estimate, so many operations in the method, not merely the last one of the operations, provide such symbol estimate output.

Figure 6B:
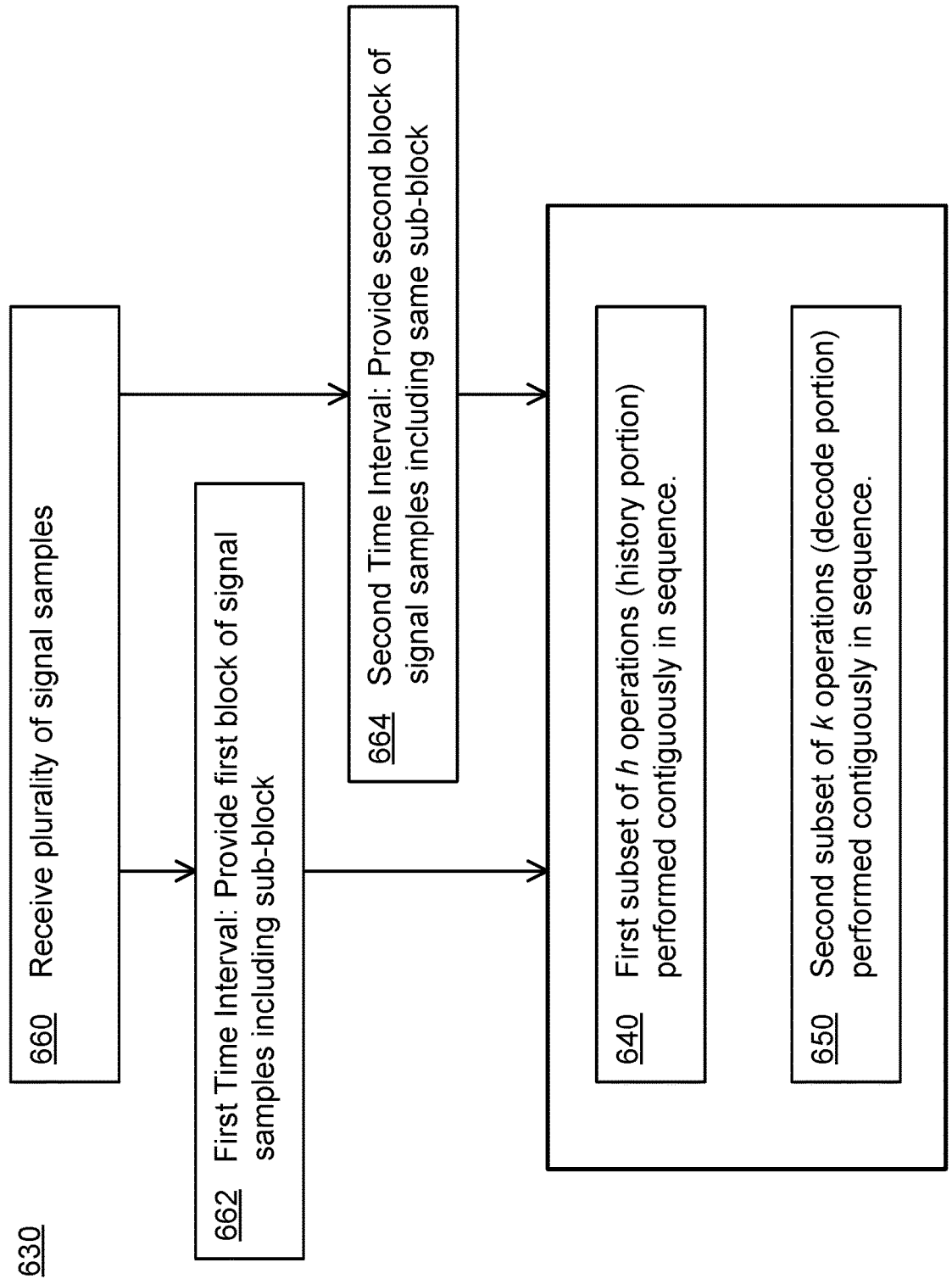
FIG. 6B illustrates a signal processing method provided in accordance with another embodiment of the present invention.

In more detail, and in various embodiments with respect to FIG. 6B, method 630 includes: a first subset 640 of operations performed contiguously in the sequence; and a second subset 650 of operations performed contiguously in the sequence after the first subset. Each of outputs which is also provided as an output of the method is an output of a respective one of the second subset of operations. The first subset 640 of operations corresponds to the history portion of the method 600 and may include h operations. The second subset 650 of operations corresponds to the decode portion of the method and may include k operations.

The method 630 may further include a sliding block demultiplexing operation. According to this sliding block demultiplexing operation, the method 630 may include receiving 660 a plurality of successive signal samples. The method may further include, during a first time interval, providing 662 a first block of successive signal samples which includes a particular sub-block of the signal samples. The samples in the sub-block may be provided as different respective ones of the input signals to the second subset of operations (i.e. operations corresponding to the decode portion). The method may further include, during a second time interval, providing 664 a second block of signal samples. The second block includes the same sub-block as above. However, the samples in the sub-block are now provided as different respective ones of the input signals to the first subset of operations (i.e. operations corresponding to the history portion). Various configurations of sliding block demultiplexing can be provided, for example in which the same symbol (or sub-block of multiple symbols) is input multiple times in different successive cycles, including to the decode portion and one or more times to the history portion.

It should be noted that other embodiments of the method can correspond to operations or steps as described with respect to the apparatus or system as described herein, whether or not explicitly described as method steps.

Certain additional variations and embodiments of the invention will now be described below.

In various embodiments, the arithmetic precision requirements and any associated additional signal processing may vary depending on the location in the sequence of a decision component. Additionally or alternatively, the arithmetic precision requirements may vary according to the tap in a multi-tap implementation of a decision component. This variability may be based on the desired power, performance, and area targets. As such, at least two different components may be configured to perform (e.g. signal processing) operations with different levels of precision. The at least two difference components may belong to a same decision component or to different decision components.

Accordingly, embodiments of the present invention may include circuits only capable of a fixed precision. This precision may vary as a function of symbol position and tap number. Symbol position refers to the position, in the sequence, of the decision component which a given circuit supports. Tap number refers to the tap which a given circuit supports. For example, for a decision component handling symbol s, a tap number t may correspond to the tap which handles the output of the decision component handling symbol s-t. The above is known as fixed index-variable arithmetic precision.

Additionally or alternatively, embodiments of the present invention may include circuits (e.g. with potentially high arithmetic precision) which are capable of having their precision dynamically adjusted. The adjustment can be performed for example via least-significant-bit (LSB) masking operations. The precision can be adjusted according to current requirements. This is known as dynamic index-variable arithmetic precision. Such an implementation may be used to dynamically scale the power and performance of the present invention based on the application and environmental requirements.

In some embodiments, the present invention may be implemented with one or more components (e.g. digital signal processor (DSP) logic components) that only compute approximate output (e.g. intermediate results) rather than exact values. This may result in an implementation with improved power and area. The approximate output may refer to digital arithmetic circuits, such as mixing, summing, comparison or decisor circuits. The circuitry can be configured so that the approximate output is still as reliable as required for a given application.

According to some embodiments, initial symbol estimation (ISE) may be incorporated for example as follows. The apparatus of FIG. 3 (or a variant thereof or corresponding method) may be complemented with additional signal processing elements to seed the decoder with ISE. Accordingly, instead of the first decision component block having no knowledge of previous symbols, some initial estimate may be provided. Such initial symbol estimation may facilitate higher performance or a reduction in other implementation parameters. For example, improvements derived from using ISE may allow the history size h to be reduced, relative to an implementation without ISE. In some embodiments, the ISE can be performed for multiple previous symbols, thereby supplying estimations for the entire decision history vector (z).

For ISE, the first decision component is provided with initial inputs, such as the supportive inputs 115 in FIG. 1. A mixer (e.g. mixer 210 as in FIG. 2) may be provided and configured to additively mix first input signal with signals present at the initial inputs, with output of the mixer being provided to the first decisor (e.g. 230 as in FIG. 2). One or more additional signal processing elements are provided. The additional signal processing elements are configured to provide signals at the initial inputs of the first decision component.

Examples of applicable ISE techniques include but are not necessarily limited to: FFE+traditional slicing; Traditional DFE; and maximum likelihood sequence detection. Slicing may refer to symbol decision operations.

Figure 7:
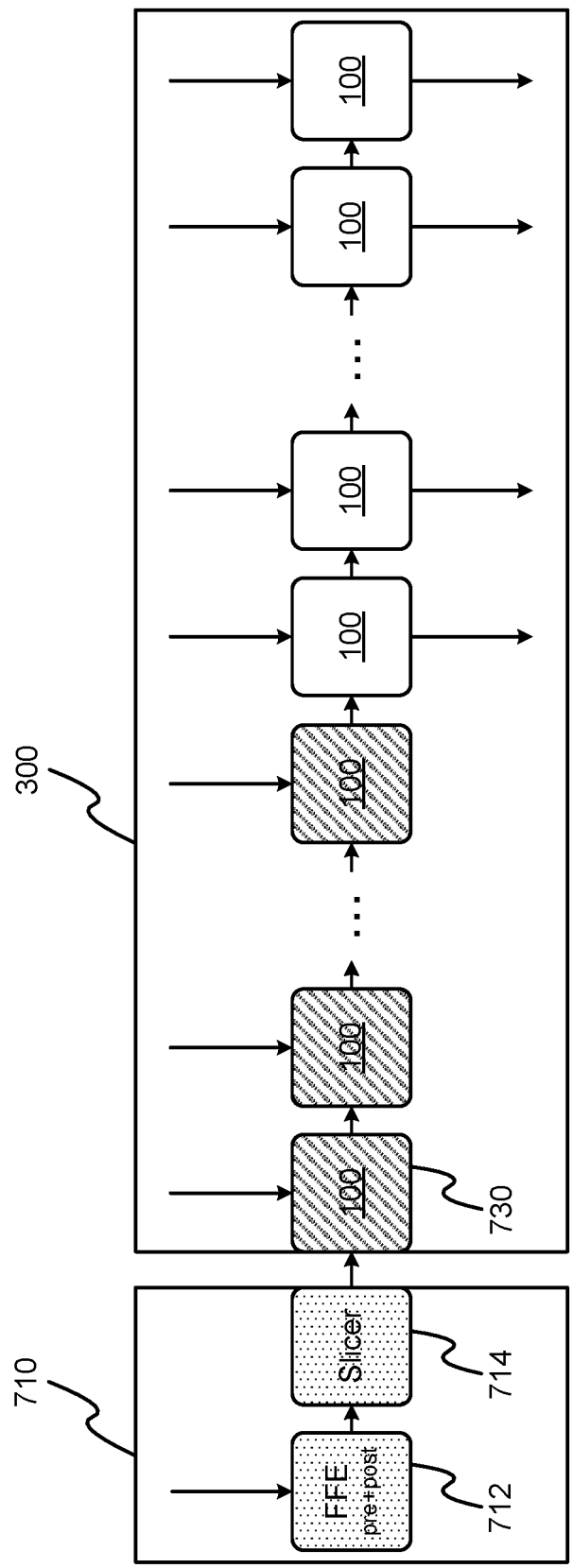
FIG. 7 illustrates a signal processing apparatus incorporating initial symbol estimation, according to another embodiment of the present invention.

An example of the apparatus with an FFE+slicer based initial symbol estimation is shown in FIG. 7. In particular, the apparatus 300, including the first decision component 730 is shown in FIG. 7. Rather than having its supportive input 115 (see FIG. 1) omitted or connected to a fixed or arbitrary signal source (e.g. grounded), the supportive input 115 of the first decision component 730 is operatively coupled to the output of an ISE block 710. The ISE block receives portions of the signal, e.g. from deserializer 530 (see FIG. 5). For example, the ISE block may receive inputs indicative of part of the signal carrying a symbol (or symbols) received immediately prior to the part of the signal which is provided to the first decision component 730. The ISE block 710 provides a decision output indicative of symbol decisions for these parts of the signal. These symbol decision can be provided and used for ISI compensation by the first decision component 730. As illustrated, the ISE block 710 may include an FFE (feed forward equalization) block 712 and a slicer 714. The FFE block 712 may be based on the feed forward equalizer as described in the prior art. The slicer 714 may make a symbol decision based on output of the FFE block 712.

The ISE block 710 may facilitate bit error rate (BER) improvement, or an improvement in one or more other implementation parameters. This improvement may facilitate an implementation with superior PPA. One notable implementation parameter that may be reduced by this approach is the minimum history size. That is, the history size h may be reduced relative to the embodiment of FIG. 3, thereby facilitating a lower power and area implementation. It is noted that embodiments of the present invention can encompass a variety of estimation methods for the entire history vector. In particular, the illustrated implementation of the ISE block 710 may offer significant PPA benefits compared to the prior DFFE architecture.

According to some embodiments, multiple equalization or decoder apparatuses according the present invention may be implemented together to provide increased aggregate data rate over a single apparatus. Two or more apparatuses according to FIG. 3 may be implemented in parallel, for example, with each apparatus operating on different input signal parts. The aggregate data rate for multiple apparatuses in such a configuration may be proportional to the sum of each apparatus's k value (where k represents the number of symbols being output by the decode part of that apparatus). This approach of using multiple parallel apparatuses can result in a lower latency decoding, a lower bit error rate, or both, than a single apparatus at expense of additional history overhead. This may result in a more PPA-effective implementation.

An embodiment illustrating two parallel apparatuses is shown in FIG. 8A. In particular, a first equalization apparatus 810 is provided and configured to receive and process a first plurality 815 of signal samples. A second equalization apparatus 820 is provided, operating in parallel with the first equalization apparatus, and configured to receive and process a second plurality 825 of signal samples. The first plurality of signal samples and the second plurality of signal samples may correspond to different overlapping or non-overlapping portions of an overall plurality of successive samples of a received signal.

Figure 8B:
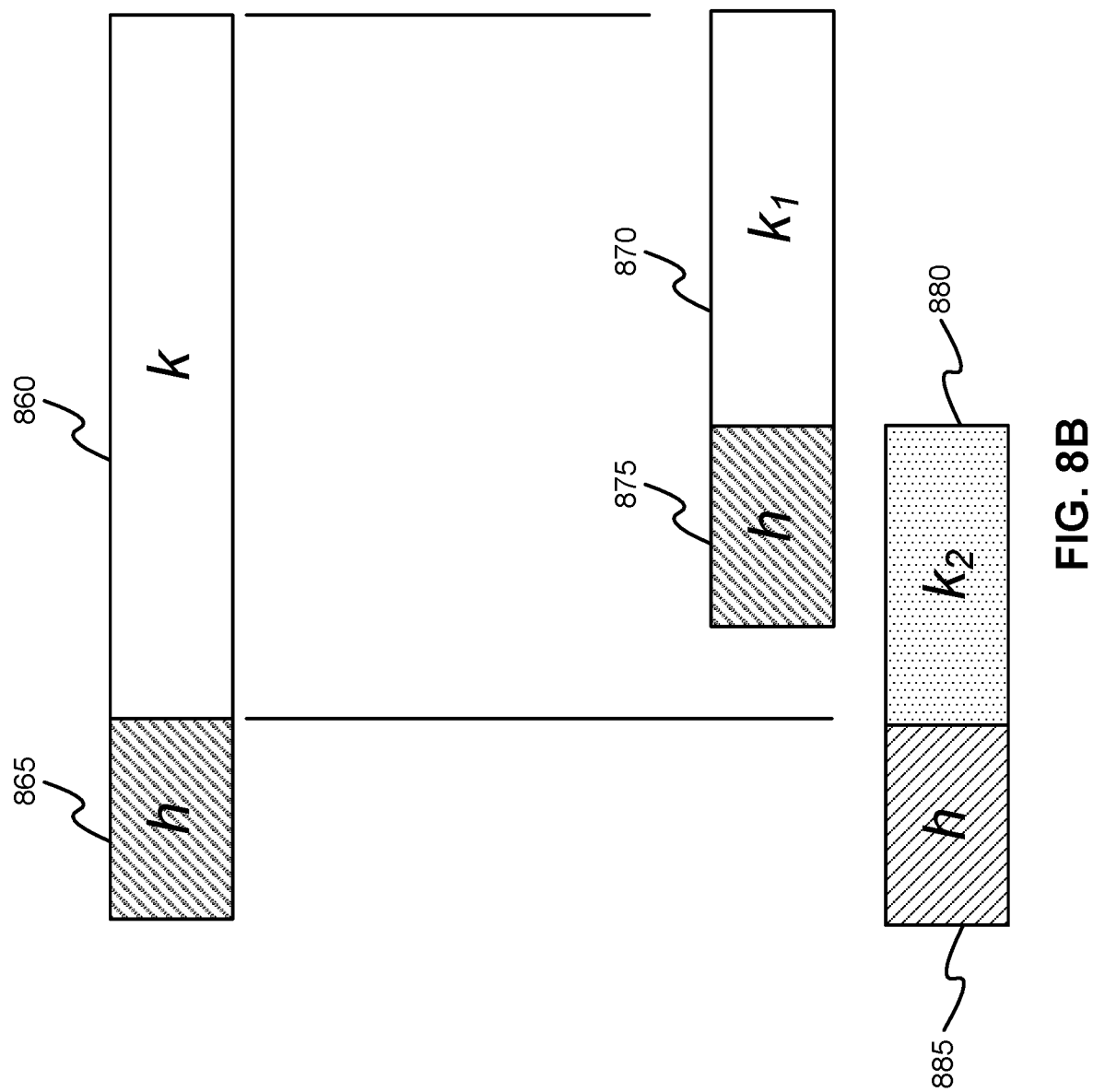
FIG. 8B diagrammatically compares operation of a single apparatus to operation of two parallel apparatuses, according to an embodiment of the present invention.

A diagram comparing operation, in one embodiment, of a single apparatus to two parallel apparatuses is shown in FIG. 8B. According to FIG. 8B, a single apparatus would provide a decode portion 860 outputting k symbols, while accepting a total of h+k symbols at a time (thus the history portion 865 is h units in length). In comparison, two apparatuses operating in parallel could operate as follows. A first apparatus could provide a decode portion 870 outputting $k_1$ symbols while accepting a total of $h+k_1$ symbols at a time (thus the history portion 875 is h units in length). A second apparatus operating in parallel with the first apparatus could provide a decode portion 880 outputting $k_2$ symbols while accepting a total of $h+k_2$ symbols at a time (thus the history portion 885 is h units in length). The horizontal direction in FIG. 8B represents successive symbols, so the history portions 875 and 885 operate on the same number of symbols, and the decode portions 870 and 880 provide contiguous, non-overlapping subsets of symbols. The lengths of the decode portions 870 and 880 collectively amount to the same length as the decode portion 860. The history portion 875 overlaps with the decode portion 880. Although all history portions 865, 875, 885 are shown as being of the same length h for ease of exposition, this is not strictly necessary.

Different implementations of parallel apparatuses can also be provided. For example, different parallel apparatuses can operate on completely overlapping sets of symbols, different partially overlapping sets of symbols, or different and completely non-overlapping sets of symbols.

Embodiments of the present invention can be combined with other symbol index-variable signal processing on its data input. Such signal processing may include, but is not necessarily limited to an FFE filter. Such signal processing may be provided in order to facilitate hitting PPA targets. The type and amount of signal processing may vary as a function of the symbol position within the apparatus. For example, symbols provided to decision components earlier in the apparatus or method sequence may be subjected to more intensive signal processing, prior to being passed on to such decision components.

Examples of how the processing may vary, for example as a function of symbol position, are provided as follows. The type of processing may vary. The number of pre and post cursor taps may vary. The tap values may vary. The range of tap values may vary. The arithmetic precision of processing operations may vary. For clarity, cursors are ISI components of the neighboring symbols that affect the "victim" symbol being decoded at a given time. Pre-cursor originates from symbols transmitted after the victim symbol and post-cursor originates from symbols transmitted before the victim symbol.

Figure 9:
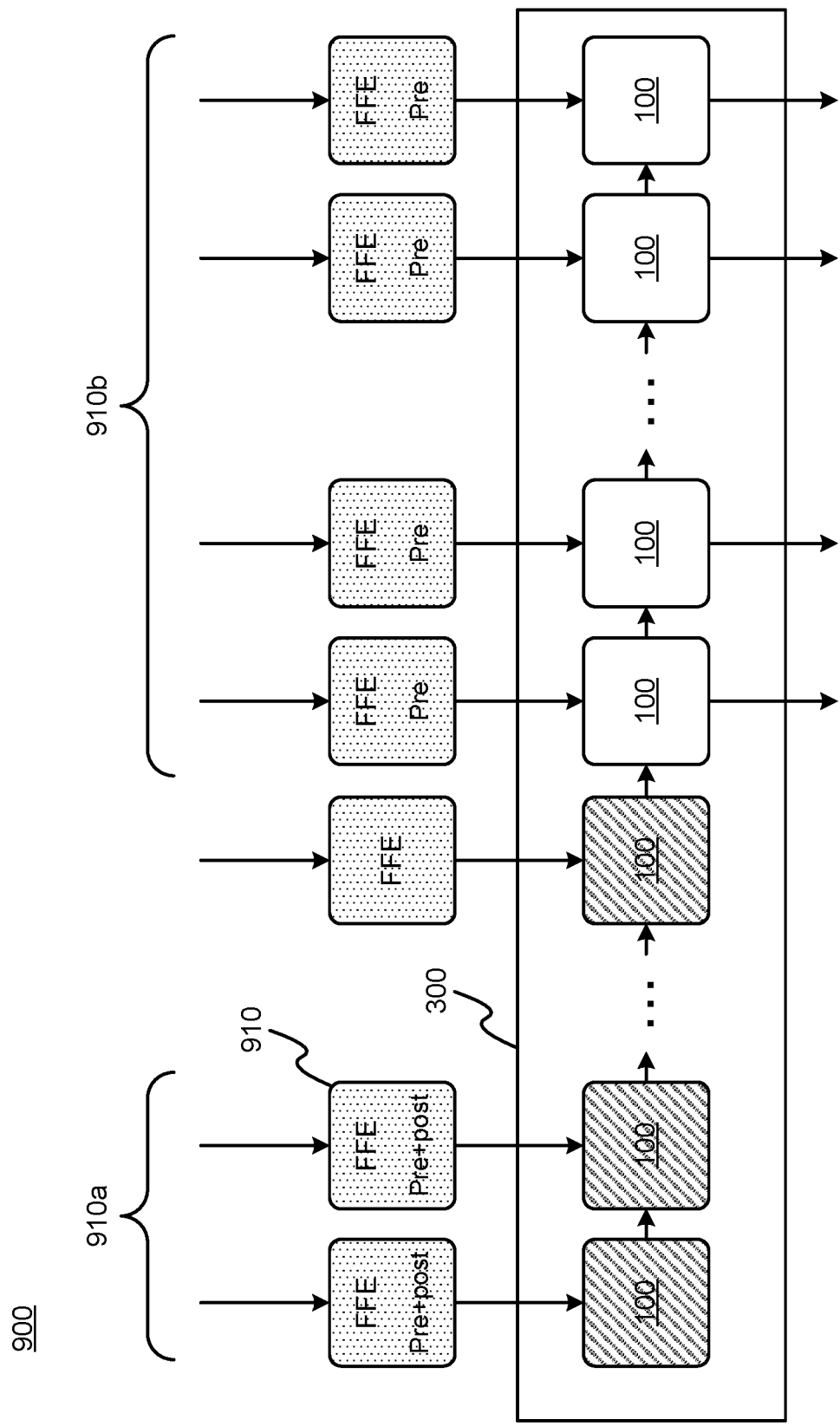
FIG. 9 illustrates a signal processing apparatus incorporating index-variable front end signal processing, according to an embodiment of the present invention.

An example of an apparatus 900 including index-variable front end signal processing is shown in FIG. 9. The apparatus 300 is provided as explained in FIG. 3. Each input 105 (See FIG. 1) of each decision component 100 of the apparatus 300 is operatively coupled to a corresponding additional signal processing element 910. Input signal samples (e.g. from a deserializer) are received and processed by the additional signal processing elements 910 before being input to the decision components. Some of the additional signal processing elements 910 may be omitted or controllably disabled or bypassed. Output of the additional signal processing elements 910 may be filtered samples or digital values indicative thereof, partially equalized symbol estimates, other digital or analog signals, or a combination thereof.

Different instances of the additional signal processing elements 910 within the same apparatus 900 may perform different types and amounts of processing. For example, signal processing elements 910a, which are coupled to decision components earlier in the sequence, may perform strong feed forward equalization (FFE) on pre and post cursor, because they are otherwise slicing (i.e. performing symbol decision) with little to no information on previously transmitted symbols which potentially cause ISI. As another example, signal processing elements 910b, which are coupled to decision components later in the sequence, may perform FFE for pre cursor only, while the decision components themselves are used for post cursor.

The additional signal processing may facilitate reduction in the required history size h, while keeping performance substantially unaltered. Accordingly, a block-based decoder apparatus with index-variable front end processing may be provided.

Embodiments of the present invention can be implemented with an h value higher than is needed for some of its applications. For applications that do not require the maximum implementable h value, the apparatus can be configured to omit or bypass a variable number of the initial decision components in the sequence. Additionally or alternatively, the decode portion of the apparatus can have a variable size depending on the throughput requirements on the current application.

Figure 10:
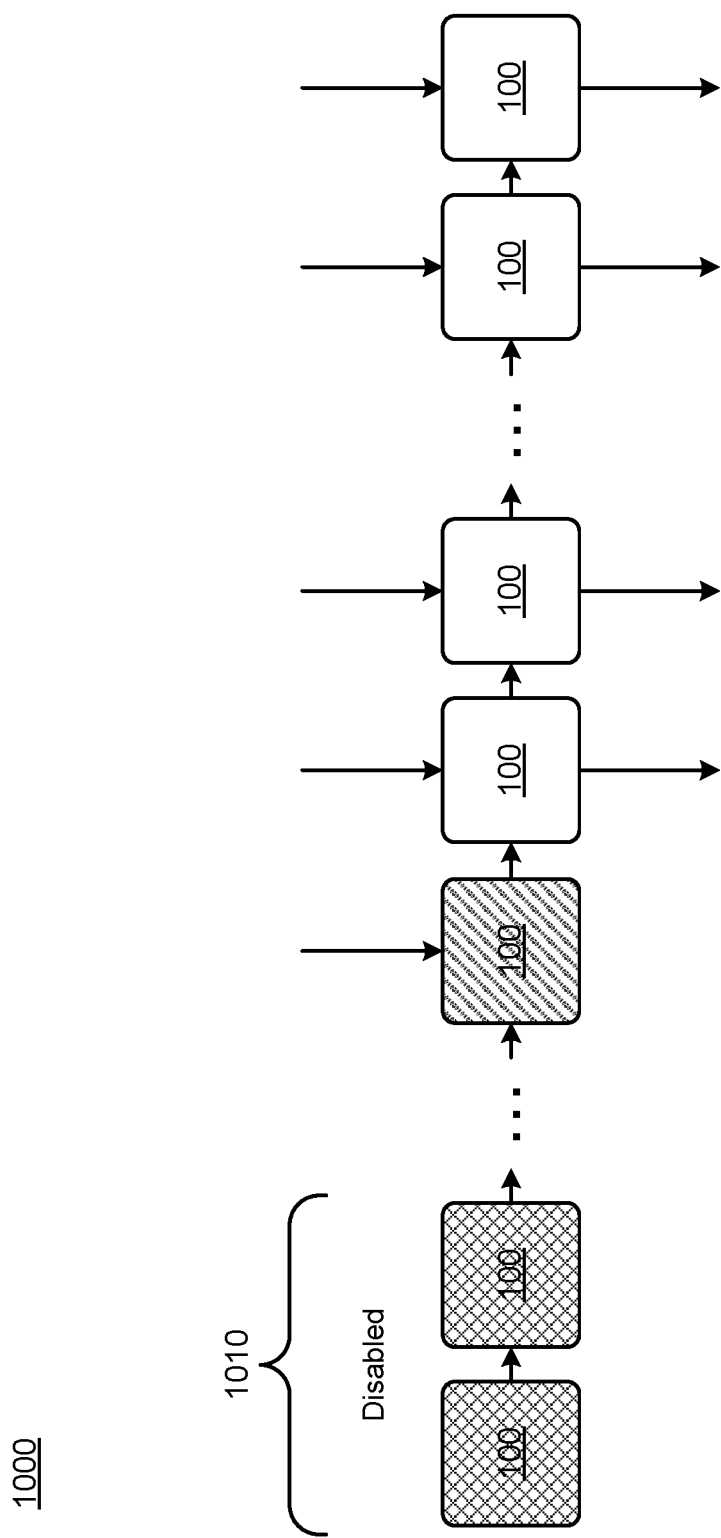
FIG. 10 illustrates a signal processing apparatus incorporating dynamic and controllable history size support, according to an embodiment of the present invention.

FIG. 10 illustrates an apparatus 1000 implementing with dynamic history size support, according to one embodiment. The apparatus 1000 is similar to the apparatus 300 of FIG. 3 and details are omitted. In particular, the first two decision components 1010 are bypassed or disabled, thereby controllably adjusting the sequence length in general and the length of the history portion of the sequence in particular. In some embodiments, a controllable number of decision components at the beginning of the sequence are disabled. In some embodiments, the deserializer which distributes signal samples among the various decision components can be controllably adjusted so that it refrains from distributing signal samples to a selectable number of decision components, for example at the beginning of the sequence, the end of the sequence, or both. Control circuitry can accordingly be provided for controllably adjusting a size of the history portion, a size of the decode portion, or both.

Dynamic symbol history lengths can be implemented in order to scale the power and BER performance of the apparatus depending on the application requirements. This allows the apparatus to be implemented to support the requirements of the most challenging conditions it is expected to be used in, but for less challenging conditions it may be reconfigured so as to reduce power usage, while still providing adequate (but possibly reduced) performance. Furthermore, dynamic scaling of the decode portion may facilitate significant power scaling in reduced throughput applications.

Figure 11:
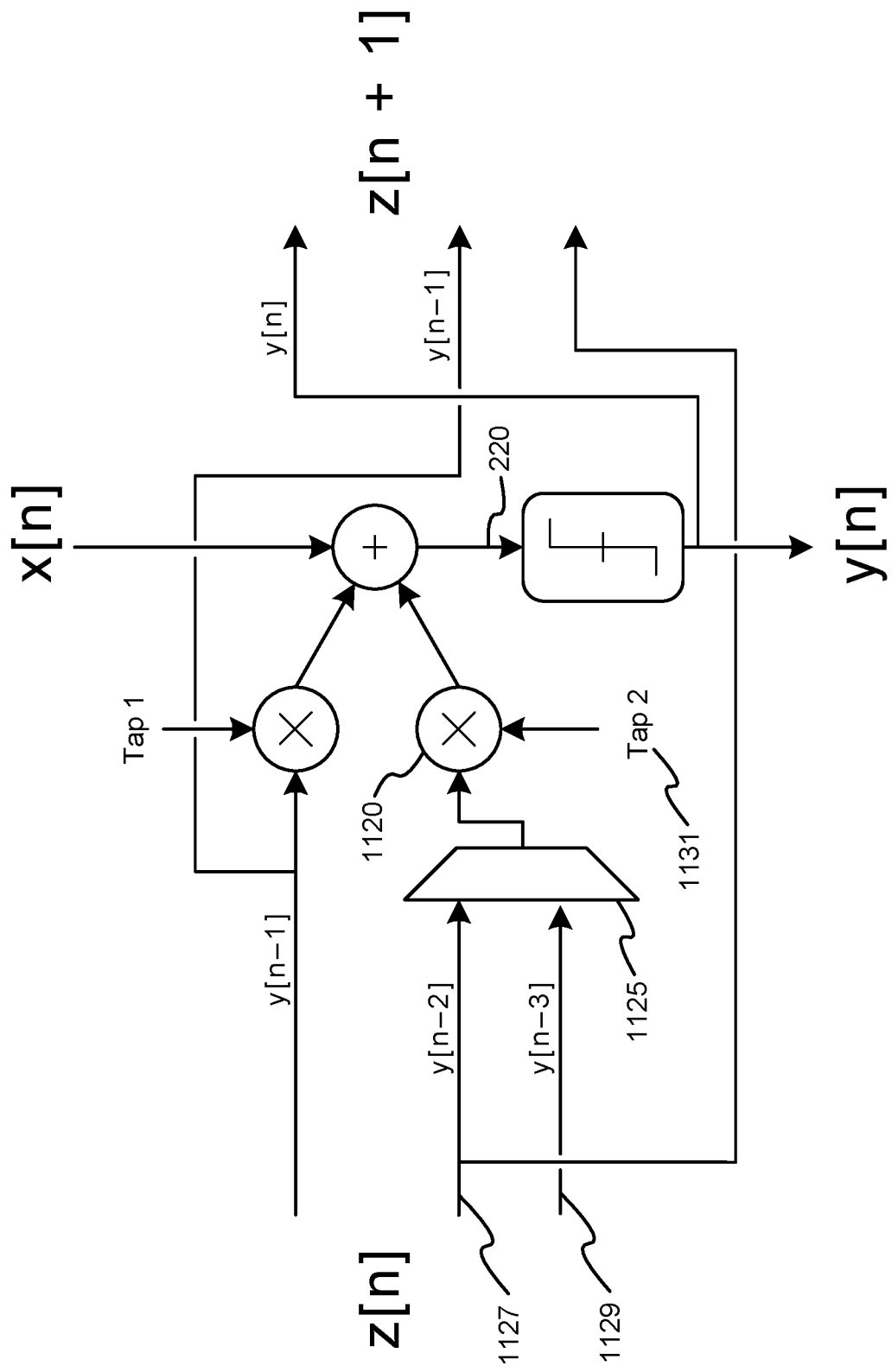
FIG. 11 illustrates an example two-tap apparatus building block, similar to that of FIG. 2, in which one tap is a roaming tap, according to an embodiment of the present invention.

Embodiments of the present invention can be implemented such that some of its ISI correction taps have configurable symbol delay. This feature may be referred to as comprising roaming taps. FIG. 11 illustrates an example two-tap apparatus, similar to that of FIG. 2, in which the second tap 1120 is roaming. In particular, a switching circuit 1125 can be operated to selectably input either the second previous symbol y[n−2] 1127 or the third previous symbol y[n−3] 1129 for mixing with the input x[n]. That is, the switching circuit 1125 may be configured to controllably select which outputs are provided as input to the mixer. These outputs are selected from among outputs of decision components occurring previously in the sequence. The above facilitates an adjustable ISI cancellation. The tap value 1131 may also be adjustable accordingly. Although FIG. 11 illustrates roaming between the second and third previous symbols, roaming can be performed between arbitrary sets of two or more previous symbols. Other operating details of FIG. 11 are similar to those of FIG. 2.

This may be a useful feature for equalizing channels that have long pulse responses, such as those caused by reflections. The ability to configure the tap delay may make the apparatus better able to adapt to unpredictable channels, applications, and environments thereby providing a more PPA-competitive solution. The roaming tap allows cancellation of ISI for symbols that are further away in time.

The finite block size (b) of the present invention leads to computational recursion being limited. This may allow for arbitrary logic pipelining to be performed as discussed above. Because the timing closure problem is addressed in this way, it is not necessary to resort to PPA-intensive unrolling/unfolding techniques.

Embodiments of the present invention potentially have wide application in the field of data communications and signal processing where some form of receiver equalization may be beneficial. Broadly speaking this may include most wireline receivers, most wireless receivers, as well as optical receivers. If new classes of receivers are developed the invention may also apply there.

Additionally, while the present disclosure discussed the invention primarily in the context of an integrated circuit implementation where processing is in real time, embodiments of the present invention may additionally or alternatively be implemented as a pure software algorithm that runs in either real-time or as offline processing.

Embodiments of the present invention can be implemented using electronics hardware, software, or a combination thereof. In some embodiments, the apparatus is implemented at least in part by one or multiple computer processors executing program instructions stored in memory. In some embodiments, the apparatus is implemented partially or fully in hardware, for example using one or more field programmable gate arrays (FPGAs) or application specific integrated circuits (ASICs) to rapidly perform the processing operations required.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical media, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless or wireline communication device.

Further, each operation of the method may be executed on any computing device and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

What is claimed is:

1. An equalization apparatus comprising:
a first decision component configured to receive a first input signal and comprising a first decisor configured to provide a first output based at least in part on the first input signal, the first output indicative of an estimate of a symbol conveyed by the first input signal; and
two or more further decision components arranged in a sequence beginning with the first decision component, each of the further decision components configured to receive a further respective input signal and comprising a further respective decisor, the further respective decisor configured to provide a further respective output based at least in part on the further respective input signal mixed with: at least part of the first output of the first decision component; at least part of the further respective output of at least one of the further decision components in the sequence prior to said one of the further decision components; or a combination thereof, the further respective output indicative of another estimate of another symbol conveyed by the further respective input signal,
wherein at least one of the decision components operates independently of output of all decision components located, in the sequence, after said at least one of the decision components; and
wherein at least one of the further respective outputs which is at least partially mixed with the further respective input signal of another one of the decision components is also provided as an output of the equalization apparatus.

2. The equalization apparatus of claim 1, further comprising a deserializer configured to:
receive a plurality of successive signal samples;
during a first time interval, provide a first block of the plurality of successive signal samples as different respective ones of the input signal and the further respective input signals; and
during a second time interval, provide a second block of the plurality of successive signal samples as different respective ones of the first input signal and the further respective input signals, wherein the first block and the second block partially overlap.

3. The equalization apparatus of claim 1, wherein:
the decision components include:
a first subset of decision components arranged contiguously in the sequence, the first subset including the first decision component; and
a second subset of decision components arranged contiguously in the sequence after the first subset, wherein each of said at least one of the further respective outputs which is also provided as an output of the equalization apparatus is an output of a respective one of the second subset of decision components.

4. The equalization apparatus of claim 3, further comprising a deserializer configured to:
receive a plurality of successive signal samples;
during a first time interval, provide a first block of the successive signal samples, the first block comprising a sub-block provided as different respective ones of the further respective input signals of the second subset of decision components; and
during a second time interval, provide a second block of the successive signal samples, the second block comprising the sub-block provided as different respective ones of the input signal and the further respective input signals of the first subset of decision components.

5. The equalization apparatus of claim 4, wherein:
the first block further comprises a first further sub-block provided as different respective ones of the input signal and the further respective input signals of the first subset of decision components, wherein signal samples in the first further sub-block are obtained prior to signal samples in the sub-block; and
the second block further comprises a second further sub-block provided as different respective ones of the further respective input signals of the second subset of decision components, wherein signal samples in the second further sub-block are obtained following signal samples in the sub-block.

6. The equalization apparatus of claim 3, further comprising circuitry for controllably adjusting a size of the first subset of decision components, a size of the second subset of decision components, or both.

7. The equalization apparatus of claim 1, wherein at least one of the further decision components comprises a mixer configured to additively mix said further respective input signal with said at least part of the first output of the first decision component; said at least part of the further respective output of at least one of the further decision components in the sequence prior to said one of the further decision components; or said combination thereof.

8. The equalization apparatus of claim 7, wherein said at least one of the further decision components comprises a switching circuit configured to controllably select which outputs are provided as input to the mixer, wherein said outputs are selected from among said at least part of the first output of the first decision component and said at least part of the further respective output of at least one of the further decision components in the sequence prior to said one of the further decision components.

9. The equalization apparatus of claim 1, wherein the first decision component further comprises one or more initial inputs and a mixer configured to additively mix said first input signal with signals present at said one or more initial inputs, wherein output of the mixer is provided to the first decisor, and wherein said signals present at said one or more initial inputs are fixed or arbitrary signals.

10. The equalization apparatus of claim 1, wherein the first decision component further comprises one or more initial inputs and a mixer configured to additively mix said first input signal with signals present at said one or more initial inputs, wherein output of the mixer is provided to the first decisor, the equalization apparatus further comprising one or more additional signal processing elements configured to provide signals at said one or more initial inputs.

11. The equalization apparatus of claim 1, further comprising respective delay elements disposed at inputs and outputs of the decision components, the delay elements facilitating a pipeline implementation of the equalization apparatus.

12. The equalization apparatus of claim 1, further comprising one or more additional signal processing elements each configured to receive respective signal samples and to provide said first input signal or to provide said further respective input signal.

13. The equalization apparatus of claim 1, wherein at least two different components of a same decision component or of different decision components are configured to perform signal processing operations with different levels of precision.

14. The equalization apparatus of claim 1, wherein at least one component of at least one decision component is configured to provide an approximate output.

15. A system comprising:
a first equalization apparatus according to claim 1, the first equalization apparatus configured to receive and process a first plurality of signal samples; and
a second equalization apparatus according to claim 1, the second equalization apparatus operating in parallel with the first equalization apparatus and configured to receive and process a second plurality of signal samples.

16. The system of claim 15, wherein the first plurality of signal samples and the second plurality of signal samples correspond to different overlapping or non-overlapping portions of a plurality of successive samples of a received signal.

17. A method comprising:
according to a first operation, receiving a first input signal and providing a first output based at least in part on the first input signal, the first output indicative of an estimate of a symbol conveyed by the first input signal;
according to each one of two or more further operations performed as part of a sequence beginning with the first operation:
receiving a further respective input signal;
generating a mixed signal by mixing the further respective input signal with: at least part of the first output; at least part of a further respective output of at least one of the further operations occurring in the sequence prior to said one of the further operations; or a combination thereof; and
providing a further respective output based at least in part on the mixed signal, the further respective output indicative of another estimate of another symbol conveyed by the further respective input signal; and
providing, as an output of the method, at least one of the further respective outputs which is at least partially mixed with the further respective input signal of another one of the operations,
wherein at least one operation of the first operation and the two or more further operations is performed independently of output of all of said operations located, in the sequence, after said at least one operation.

18. The method of claim 17, wherein:
the first operation and the further operations include:
a first subset of operations performed contiguously in the sequence, the first subset including the first operation; and
a second subset of operations performed contiguously in the sequence after the first subset, wherein each of said at least one of the further respective outputs which is also provided as an output of the method is an output of a respective one of the second subset of operations.

19. The method of claim 18, further comprising:
receiving a plurality of successive signal samples;

during a first time interval, providing a first block of the successive signal samples, the first block comprising a sub-block provided as different respective ones of the further respective input signals of the second subset of operations; and during a second time interval, providing a second block of the successive signal samples, the second block comprising the sub-block provided as different respective ones of the input signal and the further respective input signals of the first subset of operations.

20. An equalization apparatus comprising:

a plurality of at least three decision components arranged in a sequence beginning with a first decision component, wherein:

the first decision component is configured to receive a first input signal and comprises a first decisor configured to provide output indicative of a first estimate of a symbol conveyed by the first input signal;

each one of the decision components subsequent to the first decision component is configured to receive a further respective input signal and comprises a further respective decisor configured to provide output indicative of a further respective estimate of a further respective symbol conveyed by the further respective input signal, said output based on the further respective input signal mixed with output of another one of the decision components located in the sequence prior to said one of the decision components;

each one of the decision components operates independently of output of all of the decision components located, in the sequence, after said one of the decision components;

the plurality of decision components includes: a first subset of decision components arranged contiguously in the sequence, the first subset including the first decision component; and a second subset of decision components arranged contiguously in the sequence immediately after the first subset, and for each one of the decision components in the second subset, said output indicative of the further respective estimate of the further respective symbol is also provided as an output of the equalization apparatus.

* * * * *